United States Patent
Selwyn

(10) Patent No.: US 9,494,146 B2
(45) Date of Patent: Nov. 15, 2016

(54) FLUID PRESSURE AMPLIFIER

(75) Inventor: Frederick Philip Selwyn, Cornwall (GB)

(73) Assignee: WATE POWERED TECHNOLOGIES LIMITED (GB)

( * ) Notice: Subject to any disclaimer, the term of this patent is extended or adjusted under 35 U.S.C. 154(b) by 996 days.

(21) Appl. No.: 13/261,545

(22) PCT Filed: Jun. 17, 2011

(86) PCT No.: PCT/GB2011/051142
§ 371 (c)(1),
(2), (4) Date: Mar. 25, 2013

(87) PCT Pub. No.: WO2011/161435
PCT Pub. Date: Dec. 29, 2011

(65) Prior Publication Data
US 2013/0177456 A1    Jul. 11, 2013

(30) Foreign Application Priority Data

Jun. 21, 2010   (GB) .................................. 1010379.4

(51) Int. Cl.
*F04B 23/00*    (2006.01)
*F02C 5/06*     (2006.01)
(Continued)

(52) U.S. Cl.
CPC ............. *F04B 23/00* (2013.01); *F02C 5/06* (2013.01); *F03B 3/18* (2013.01); *F03B 17/025* (2013.01); *F03B 17/06* (2013.01); *F04F 7/02* (2013.01); *F05B 2250/15* (2013.01); *F05B 2250/25* (2013.01); *Y02E 10/223* (2013.01); *Y02E 10/28* (2013.01); *Y02E 10/38* (2013.01)

(58) Field of Classification Search
CPC ............. F04B 23/00; F04B 9/105; F04B 9/1053; F04B 9/1056; F04B 9/107; F04B 9/1076; F03B 17/025; F03B 17/06; F03B 3/18; F04F 7/02; Y02E
USPC ............. 417/383–387, 334, 330, 226, 225
(Continued)

(56) References Cited

U.S. PATENT DOCUMENTS 36,397 A * 9/1862 Eames ................... F04B 9/127
  417/401
422,935 A   3/1890 Hanson
(Continued)

FOREIGN PATENT DOCUMENTS

SU   720 196         3/1980
WO   WO 94/10452 A1  5/1994
(Continued)

*Primary Examiner* — Ted Kim
(74) *Attorney, Agent, or Firm* — Ira S. Dorman

(57) ABSTRACT

A housing 10 defining a duct 11 for fluid flow contains a cylinder arrangement 18-20 mounted in or at an outlet end of the duct. An input piston 30 is exposed to the fluid flow through the duct and an obturator member 21 is mounted in the duct 11 and arranged to periodically close the duct downstream of the input piston 30 such that the body of fluid flowing through the duct applies an increased pressure to the input piston. Resulting movement of the input piston can be used to directly provide mechanical power, generate electricity, or provide compression of a volatile fluid which, when ignited, provides thrust through rapid exit of combustion products.

11 Claims, 3 Drawing Sheets

(51) Int. Cl.
*F03B 3/18* (2006.01)
*F03B 17/02* (2006.01)
*F03B 17/06* (2006.01)
*F04F 7/02* (2006.01)

(58) Field of Classification Search
CPC .................. 10/38;Y02E 10/28; Y02E 10/223; F05B 2250/15; F05B 2250/25
See application file for complete search history.

(56) References Cited

U.S. PATENT DOCUMENTS

| | | | | |
|---|---|---|---|---|
| 1,943,102 A | * | 1/1934 | Woodruff | F04B 15/02 184/29 |
| 3,137,994 A | * | 6/1964 | Zwicky | B63H 11/14 440/45 |
| 3,163,001 A | * | 12/1964 | Reilly | F02K 5/023 123/68 |
| 3,406,519 A | * | 10/1968 | Hackett | B60T 11/224 60/563 |
| 3,608,312 A | * | 9/1971 | Miltenberger | F02K 9/86 60/245 |
| 3,830,061 A | | 8/1974 | Severinsson | |
| 3,951,094 A | * | 4/1976 | Jastram | B63H 11/12 440/38 |
| 3,952,517 A | * | 4/1976 | Decker | F03B 13/145 417/337 |
| 4,076,463 A | * | 2/1978 | Welczer | F03B 13/187 417/331 |
| 4,712,202 A | * | 12/1987 | Chelminski | G01V 1/137 181/118 |
| 6,004,173 A | * | 12/1999 | Schott | B63H 11/103 440/38 |

FOREIGN PATENT DOCUMENTS

| | | |
|---|---|---|
| WO | WO 97/37136 A1 | 10/1997 |
| WO | WO 2009/103332 A1 | 8/2009 |

* cited by examiner

FLUID PRESSURE AMPLIFIER

TECHNICAL FIELD OF THE INVENTION

This invention relates to fluid pressure amplifiers.

BACKGROUND

Numerous devices have been proposed for capturing the natural movements of water in rivers, waves or tidal movements of the sea, or for utilising the wind as a source of power.

The present invention seeks to provide a new and inventive apparatus for amplifying the pressures produced by such fluid movements in order to drive equipment such as pieces of machinery or electricity generators, or produce thrust.

SUMMARY OF THE INVENTION

The present invention proposes a fluid pressure amplifier which includes a housing defining a duct for fluid flow, a cylinder arrangement mounted in or at an outlet end of the duct and containing an input piston exposed to the fluid flow, an obturator member mounted in the duct and arranged to periodically close the duct downstream of the input piston such that the body of fluid flowing through the duct applies an increased pressure to the input piston.

Resulting movement of the input piston can be used to directly provide mechanical power or generate electricity.

Further pressure amplification may be obtained if the input piston is linked to an output piston, and the input piston is of greater cross-sectional area than the output piston. The pistons may be arranged such that movement of the input piston causes the output piston to apply an amplified pressure to an output fluid.

In small installations the obturator member may take the form of a resilient ring which oscillates in the fluid flow, but in larger installations the obturator member may take the form of a valve member which has mechanical assistance to periodically move in and out of the sealing position, e.g. a mechanical actuator arrangement.

In addition to providing mechanical or electrical power the fluid pressure amplifier may be used in a propulsion system, in which the output piston is arranged to compress a charge of combustible fuel which is ignited to produce thrust by rapid expansion.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
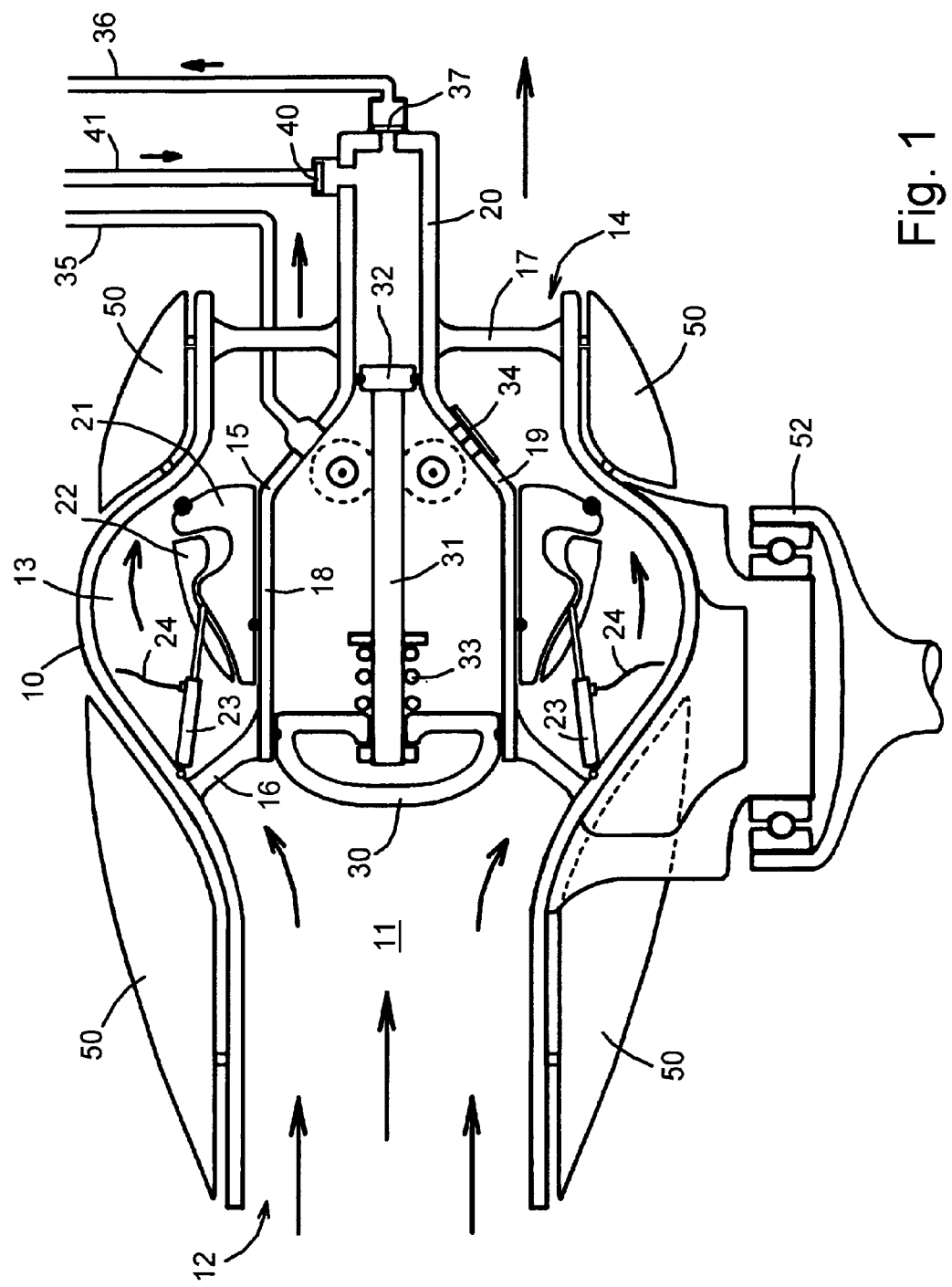
FIG. 1 is a longitudinal section through a fluid pressure amplifier in accordance with the invention.

As shown in FIG. 1, the fluid pressure amplifier comprises a housing 10 which forms a through-duct 11 incorporating an inlet section 12, an enlarged mid section 13, and a short outlet section 14, all blending smoothly into each other. A casing 15 is mounted coaxially within the duct 11 by means of spiders 16 and 17, either completely within the duct as shown or projecting from the outlet section 14. The casing comprises a relatively wide cylinder 18 mounted in the mid section 13, an intermediate part-conical transition section 19, and a narrower cylinder 20 which projects from the outlet section 14. An annular obturator valve member 21 is slidably and sealingly mounted about the cylinder 18 in the flow path through the duct 11, the valve member being provided with an external cowl 22 to ensure a smooth flow of fluid over the valve member 21. The flow of fluid through the duct 11 acts to move the valve member 21 into a sealing position in which the annular gap between the cylinder 18 and the housing 10 is sealingly closed. A number of hydraulic, pneumatic or electrically-operated actuator rams 23 act between the housing 10 and the valve member 21 to assist movement of the valve member and produce regular periodic movement thereof into the sealing position. The rams are controlled remotely through conduits and/or cables 24 from a remote processing unit which uses appropriate sensory inputs to optimise and govern the frequency of operation, speed of movement and other operating characteristics of the valve member.

The cylinder 18 contains an input piston 30 (or equivalent means such as a diaphragm assembly) which is connected via a push rod 31 to a smaller diameter output piston 32, or equivalent, which is slidably and sealingly mounted in the narrower cylinder 20. When the valve member 21 acts to close the flow path through the duct 11 as described, the momentum of the body of fluid flowing through the duct acts on the input piston 30 causing the pistons to move into the casing 15, towards the right as shown. The input piston 30 preferably has a lost-motion connection with the rod 31 allowing the piston 30 to move against a percussion spring 33 mounted about the rod, to reduce shock upon initial movement. One or more ports or valves 34 are provided in the casing 15 to allow evacuation or scavenge of fluid from the cylinder 18 into the duct 11 downstream of the valve member 21. In addition, a control conduit 35 can be connected into the space between the pistons allowing a suitable control system to further regulate the operation of the pressure amplifier by moving fluid in or out of the space between the pistons at an appropriate point in the operating cycle.

Movement of the output piston 32 applies a relatively high pressure to fluid within the smaller diameter cylinder 20, causing fluid to be expelled from the cylinder 20 through an outlet pipe 36 via a non-return valve 37.

When the rams 23 move the valve member 21 to re-open the flow path through the duct 11 the pistons 30 and 32 can be returned to the starting position by pumping fluid into the casing 15 through the control conduit 35 and/or into the casing 20 through a conduit 41 via a non-return valve 40. Although fluid could be drawn through non-return valve 40 directly from the surrounding environment, the provision of a separate conduit 41 enables a closed fluid recirculation path to be provided so that fluid pumped out through the pipe 36 can be returned to the cylinder 20 during the return stroke of the pistons.

When the valve member 21 acts to close the duct 11 the movement of fluid within the duct applies an amplified fluid pressure to the input piston 30 using the ram jet principle. In addition, the movement of the smaller diameter output piston 32 causes an even greater pressure to be applied to the fluid downstream of the smaller piston causing pulses of fluid to be expelled from the output pipe 36 at a very high relative average pressure.

The supply of high pressure fluid from the outlet pipe 36 can be used to power remote machinery or generate electricity by means of an hydraulic or pneumatic turbine or motor. Alternatively, the casing 15 and the piston assembly 30, 32 could be reconfigured such that one incorporates a magnetic member and the other incorporates an induction coil. Movement of the piston assembly relative to the casing 15 will cause an electric current to be induced in the coil, which can be transferred to remote equipment via electrical cables.

Potential uses of the fluid pressure amplifier include utilisation of the natural flow of rivers, tidal movements of the sea, or wind energy, to provide mechanical or electrical power, or with the addition of fuel to provide a thrust propulsion system. The housing 10 may be provided with external flow deflectors 50 to enhance the dynamic characteristics of the amplifier. The housing 10 can be mounted on a rotatable hub assembly 52 permitting the housing to be rotated to align with the prevailing direction of fluid flow, being either freely rotating or moved by an hydraulic, pneumatic or electrical motor (not shown).

Figure 2:
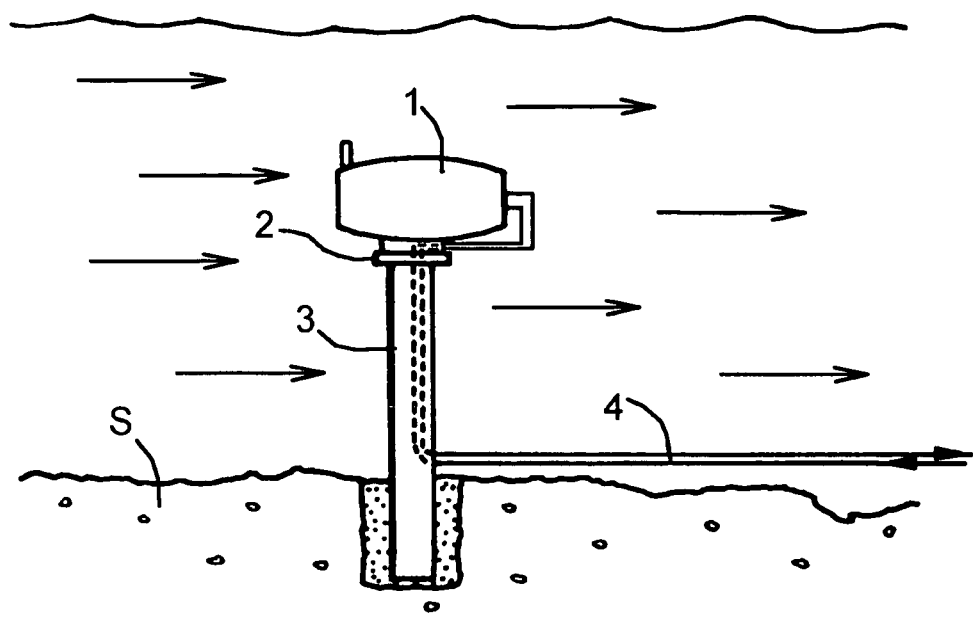
FIG. 2 is a side view of a typical installation incorporating the fluid pressure amplifier.

In FIG. 2 the fluid pressure amplifier 1 is shown rotatably installed on a platform 2 at the top of a column 3 which is fixed in the seabed S. Power is removed from the amplifier via pipes and/or electrical cables 4 which also carry control lines running in the return direction from a base station (not shown).

Figure 3:
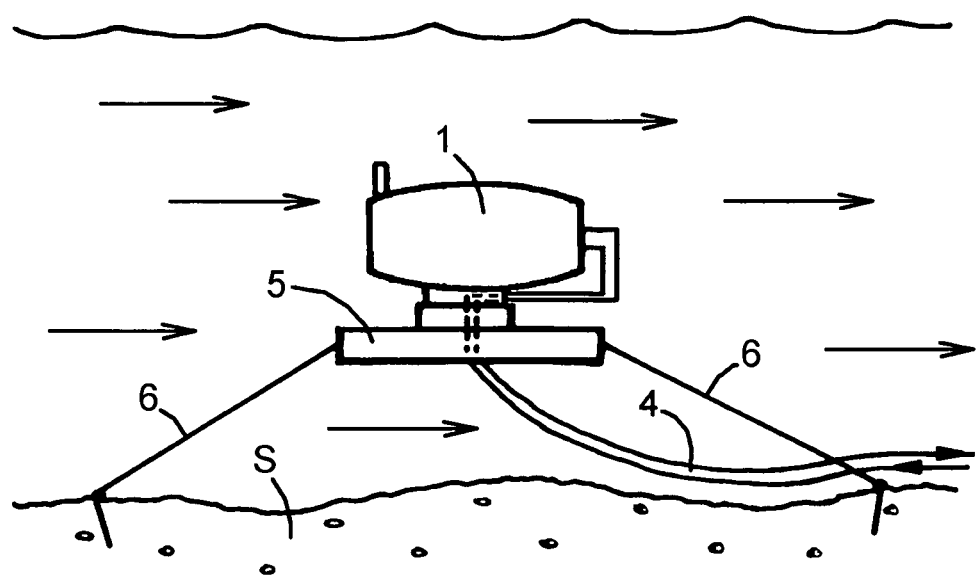
FIG. 3 is a side view of another installation which incorporates the fluid pressure amplifier.

In an alternative form of installation shown in FIG. 3, the fluid pressure amplifier 1 may be rotatably mounted on a pontoon 5 which is anchored to the seabed S by cables 6. Again, pipes and/or electrical cables 4 connect the amplifier 1 with the remote base station.

Power obtained by the fluid pressure amplifier could also be used for numerous other purposes such as the desalinization of sea water for human consumption or the electrolysis of water into hydrogen and oxygen. The amplifier can be carried by a vehicle such as a boat or aircraft such that the relative fluid flow can be used to provide mechanical or electrical power for the vehicle.

Additional piston and cylinder assemblies can be mounted on the outside of the housing if desired.

The length of the inlet and outlet duct sections may be varied to allow fine tuning of the device for optimum efficiency.

A further embodiment of the amplifier could have an impulse turbine and electric generator or turbine/compressor assembly mounted at the fluid output end.

Figure 4:
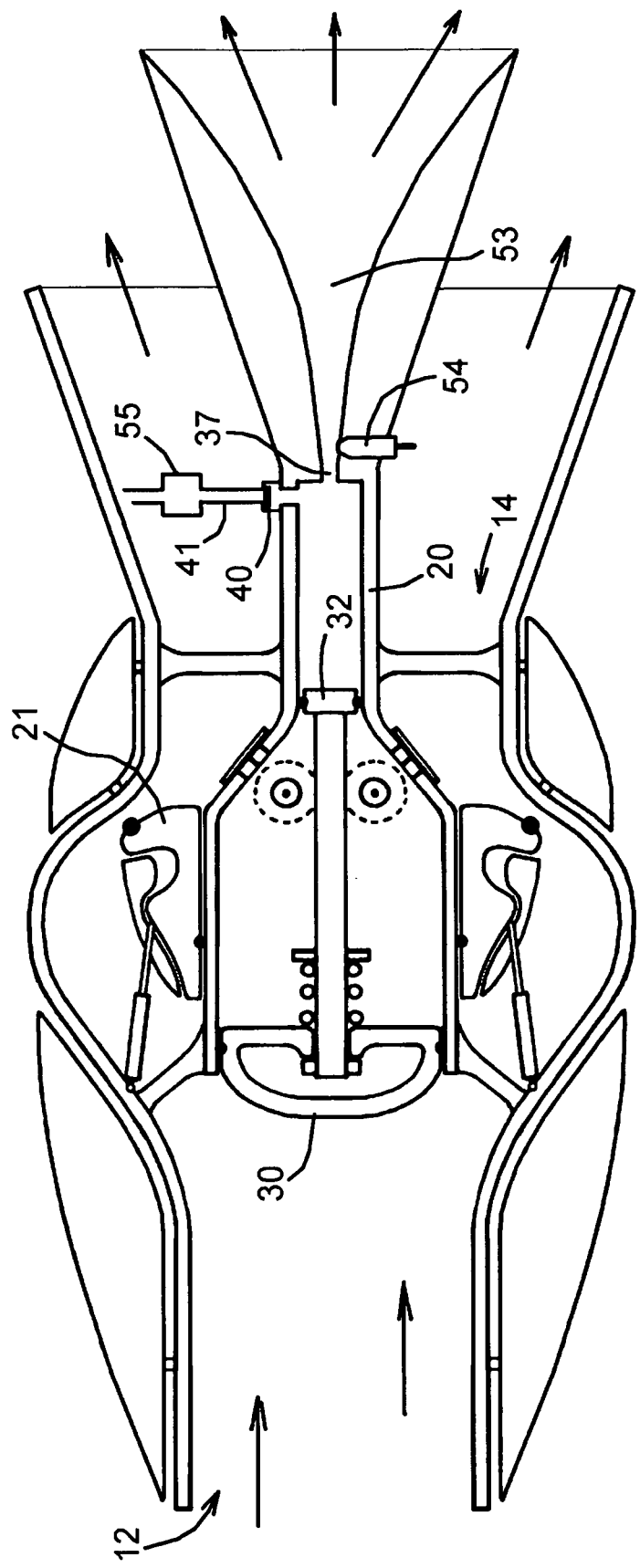
FIG. 4 is a longitudinal section through the fluid pressure amplifier which has been modified to incorporate a combustion and propulsion system.

In FIG. 4 the fluid pressure amplifier is configured such that when in relative movement through an air or oxygen containing fluid the main fluid stream entering the inlet 12 can be compressed by the ram effect as previously described, such that the primary piston 30, acting via secondary piston 32, is able to force a secondary oxygen and fuel containing charge in the secondary cylinder 20 through a nozzle 37. The compressed charge discharges into a combustion chamber 53 within a divergent output nozzle and is ignited by an ignition means 54 such that it exits the combustion chamber at a greatly enhanced velocity thereby imparting considerable thrust to the assembly. As the secondary piston 32 completes it stroke, some of this combusted gas at higher pressure momentarily enters the secondary cylinder 20 and reacts against the secondary piston 32 thereby forcing it back in the opposing direction, such that the momentum applied is able to return the piston assembly to its initial position and in the process scavenge a replacement charge of oxygen containing fluid and fuel from an injection, carburetor or alternative type mixing device 55 through the inlet pipe 41 and non return valve 40. As the main fluid flow entering inlet 12 is prevented from exiting through to outlet 14 by the sudden closure of the obturator valve 21, the momentum of the fluid acts again on either side of the primary piston 30 to repeat the cycle. The assembly can be attached to another unit requiring a means of thrust propulsion such as a land, air or space vehicle or can be incorporated within the design of such a vehicle as a unitary construction.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A fluid pressure amplifier (1) which includes a housing (10) defining a duct (11) for fluid flow, a cylinder arrangement (15) mounted in the duct and containing an input piston (30) exposed to the fluid flow, an obturator member (21) mounted in the duct and arranged to periodically close the duct (11) downstream of the input piston (30) such that the body of fluid flowing through the duct applies an increased pressure to the input piston causing motion thereof, the input piston connected to an output piston positioned in a chamber, the chamber having an inlet for an incoming stream and an outlet for outputting the stream with an amplified pressure, wherein:
   the housing (10) has opposite ends at which an inlet (12) and an outlet (14) are located;
   the amplifier (1) is constructed to be mounted in a flowing fluid, with the duct (11) of the housing (10) extending axially for alignment with the prevailing direction of fluid flow through the amplifier (1) and from the inlet (12) to the outlet (14) of the housing;
   the cylinder arrangement (15) is fixedly mounted coaxially within the duct (11); and
   the obturator member comprises an annular member (21) and is located about the cylinder arrangement (15), the obturator member being movable relative to the cylinder arrangement (15) such that movement of the obturator member in the prevailing direction of fluid flow causes the obturator member to close the duct.

2. A fluid pressure amplifier according to claim 1 in which the input piston (30) is linked to an output piston (32), and the input piston is of grater cross-sectional area than the output piston.

3. A fluid pressure amplifier according to claim 2 in which the pistons are arranged such that movement of the input piston (30) causes the output piston (32) to apply an amplified pressure to an output fluid.

4. A fluid pressure amplifier according to claim 2 in which a space within the cylinder arrangement (15) between the two pistons is ported to the duct downstream of the obturator member.

5. A fluid pressure amplifier according to claim 2 which includes a lost motion arrangement between the input piston and the output piston.

6. A fluid pressure amplifier according to claim 5 in which the lost motion arrangement includes a piston rod (31) which couples the two pistons together with a sliding connection which acts against spring means (33) to reduce shock upon initial movement.

7. A fluid pressure amplifier according to claim 2 when used in a propulsion system, in which the output piston (32) is arranged to compress a charge of combustible fuel which is ignited to produce thrust by rapid expansion.

8. A fluid pressure amplifier according to claim 7 in which the compressed charge of fuel is injected into a combustion chamber (53) via an injection nozzle (37), and the compressed charge is ignited in the combustion chamber.

9. A fluid pressure amplifier according to claim 1 in which the obturator member comprises a resilient ring which oscillates in the fluid flow.

10. A fluid pressure amplifier according to claim 1 additionally including a mechanical actuator arrangement (23), and wherein the obturator member comprises a valve member (21) which is periodically moved by the mechanical actuator arrangement (23) to close the duct.

11. A fluid pressure amplifier according to claim 10 in which the mechanical actuator arrangement comprises an actuator ram (23).

\* \* \* \* \*